Patented Jan. 6, 1942

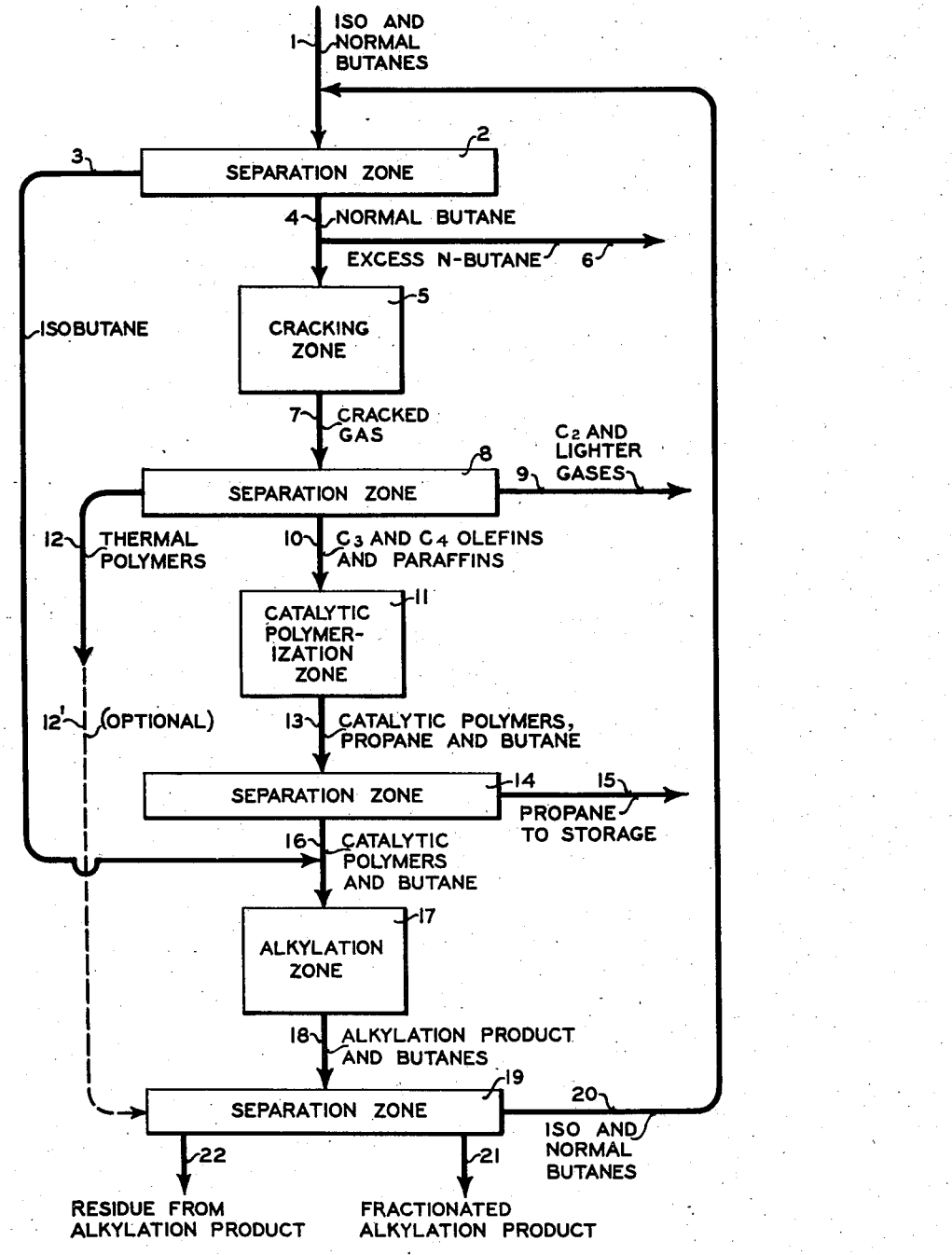

2,268,557

UNITED STATES PATENT OFFICE 2,268,557

TREATMENT OF HYDROCARBONS

Samuel S. Allender, Chicago, Ill., assignor to Universal Oil Products Company, Chicago, Ill., a corporation of Delaware Application December 28, 1939, Serial No. 311,287

11 Claims. (Cl. 196—10)

This invention relates to the treatment of butanes, and in a more specific sense it is concerned with a process for converting butanes into gasoline of high antiknock value.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristic according to seasonal demands. Since the amount of butane required for this purpose is less in summer than in winter there are frequent periods of over production of these gaseous hydrocarbons during which they are utilized largely for domestic and industrial fuel purposes. Therefore, it is of considerable importance at the present time to convert as much as possible of the excess butane production into gasoline, and the present invention is especially concerned with a process for accomplishing this object.

In one specific embodiment the present invention comprises a continuous process for producing gasoline from a mixture of isobutane and normal butane which comprises separating isobutane from normal butane by fractional distillation, cracking said normal butane to produce a gas mixture containing polymerizable olefins, separating a fraction of 2-carbon atom and lighter gases and a normally liquid fraction consisting of thermal polymers from 3- and 4-carbon atom olefins and paraffins contained in said gas mixture, contacting said 3- and 4-carbon atom olefins and paraffins with a polymerization catalyst to produce catalytic polymers in admixture with propane and butane, separating said propane from catalytic polymers and butane, admixing said catalytic polymers and butane with isobutane separated from the original butane mixture, reacting said isobutane with said catalytic polymers in the presence of an alkylation catalyst to produce a substantially saturated hydrocarbon product, fractionally distilling said hydrocarbon product to separate a normally liquid mixture of alkylation products from unconverted butanes which are recycled to admix with the butanes charged to the original fractionation step.

By this invention high antiknock gasoline useful in the production of aviation fuel is formed from butanes by reactions involving cracking of normal butane into an olefin-containing gas mixture, catalytic polymerization of the normally gaseous olefins into normally liquid olefinic polymers, and alkylation of isobutane by said olefinic polymers in the presence of an alkylating catalyst, which may comprise sulfuric acid, hydrogen fluoride, phosphoric acid, a precalcined composite of an acid of phosphorus and a generally siliceous adsorbent, and aluminum chloride together with relatively small amounts of hydrogen chloride.

Cracking of normal butane to produce butenes, propene, ethylene in admixture with butane and lighter gaseous paraffins is preferably carried out in tubular reactors capable of withstanding the joint conditions of temperature and pressure employed for effecting this reaction. The tubular heater is so designed that in the time during which normal butane is cracked there is produced an optimum yield of olefins including ethylene, propene, and butenes readily utilizable for polymerization to normally liquid mono-olefins which are utilized for alkylating isobutane under less severe pressure conditions than are required when the alkylating olefins employed are normally gaseous. Also, this cracked gas mixture will usually contain some pyrolytic polymer comprising essentially aromatic and olefinic hydrocarbons.

Polymerization of gaseous olefins formed by cracking normal butanes may be effected at a temperature in the approximate range of 300–550° F. under a pressure of the order of 200–1500 pounds per square inch in the presence of so-called "solid phosphoric acid" catalysts, as described in U. S. Patent No. 1,993,513 and others. This solid phosphoric acid catalyst may be made by the successive steps of (1) mixing the phosphoric acid with a finely divided and relatively inert, generally siliceous, carrying material, such as, for example, diatomaceous earth to form a rather wet paste (the acid ordinarily being in major proportion by weight); (2) calcining at a temperature of the order of 752–932° F., to produce a solid cake; (3) grinding and sizing to produce particles of usable mesh; and (4) rehydrating the catalyst granules at a temperature of the order of 450–550° F. to produce an acid composition corresponding to optimum polymerizing activity. This procedure may be varied by forming particles from the original paste by extrusion or pelleting methods and following with the calcining and rehydrating steps. In the reactions taking place during calcining it is evident that some of the acid is "fixed" on the carrier and that some meta-phosphoric acid, which is substantially without polymerizing activity, is formed. The rehydrating step evidently produces an acid composition corresponding closely to the pyro-acid having a formula $H_4P_2O_7$ and corresponding to the double oxide formula $P_2O_5.2H_2O$.

The solid phosphoric acid catalysts preferred for use in the present invention are characterized by the fact that they are precalcined before use both to fix the composition of the acid and to form particles of a granular structure capable of withstanding the conditions of service to which they are subjected. When these catalysts become coated with carbonaceous deposits they can be reactivated by oxidation with air, or with gas mixtures of controlled oxygen concentration at temperatures of the approximate order of 800–1000° F., followed by contacting with superheated steam at about 450–550° F., under atmospheric pressure to rehydrate the acid to the most desirable composition. Rehydration at higher temperatures may be made under steam pressures corresponding to approximately the water vapor pressure of the catalyst at the operating temperature.

Polymerization of the normally gaseous olefin content of such gases as are produced by the pyrolysis of butane may be passed through a chamber containing a section or several sections of the solid catalyst at a rate consistent with the production of a good yield of liquid products. Following the polymerization step the products may be fractionated to separate propane from a mixture comprising butanes and catalytic polymers, which are used subsequently for alkylating isobutane.

For alkylation of isobutane by normally liquid polymers formed by the catalytic polymerization of propene and butenes with the view of producing high yields of substantially saturated gasoline without substantial decomposition of the alkylation products through so-called destructive alkylation reactions when employing sulfuric acid, hydrogen fluoride, or aluminum chloride with hydrogen chloride as catalyst, the process is preferably carried out at a temperature below approximately 210° F. and under sufficient pressure that substantial proportions of the 4-carbon atom hydrocarbons are present as liquids. While the exact operating temperature for alkylation is dependent upon the composition of the mixture being treated, the lower temperatures at which alkylation proceeds are approximately −15° F. when effecting alkylation in the presence of sulfuric acid of 90–100% concentration, −60° F. with approximately 90–100% hydrogen fluoride as catalyst, and approximately −50° F. when using substantially anhydrous aluminum chloride with hydrogen chloride as the catalyst mixture.

When phosphoric acid is the alkylation catalyst employed it is preferably used in the form of a solid composite or granular precalcined mixture with a generally siliceous adsorbent, such as diatomaceous earth. Such a preferred composite alkylating catalyst is the so-called "solid phosphoric acid" polymerization catalyst described above in this specification. In the presence of such granular material isobutane is alkylated by olefins at a temperature in the approximate range of 600–900° F. under a pressure of the order of 1000–3000 pounds per square inch and a substantially saturated motor fuel is produced.

The use of a cooperative combination of normal butane cracking to produce gaseous olefins, catalytic polymerization of said gaseous olefins to normally liquid olefinic polymers, which are readily separated from unconverted butanes and lighter paraffin gases, and alkylation of isobutane by said olefinic polymers according to the process of this invention, has the advantage that substantially saturated gasoline of high octane number may be produced from mixtures of isobutane and normal butane without the necessity of hydrogenation, which is inherent in the formation of gasoline which may be used for aviation purposes by processes involving dehydrogenation or cracking of butanes, polymerization of the resultant gaseous olefins to normally liquid olefins, and hydrogenation of said liquid iso-olefins to liquid isoparaffins.

After such alkylation treatment the total product consisting of substantially saturated liquid hydrocarbons and unconverted butanes may be fractionally distilled and separated into butanes which are recycled to further cracking and alkylation treatment, an alkylation product fraction of desired end point, and a higher boiling residue. If desired, the thermal polymers formed during cracking of normal butane and comprising essentially olefinic and aromatic hydrocarbons may be introduced into the same separation zone in which the alkylation product is fractionated. In this case a blend of alkylation product and thermal polymers may be separated from unconverted butanes and relatively high boiling materials.

For the purpose of illustrating the combination of steps characteristic of the present invention, the attached drawing shows diagrammatically a typical process flow for producing gasoline of high octane number from a isobutane-normal butane fraction.

Referring to the drawing, a hydrocarbon mixture comprising essentially isobutane and normal butane is introduced through line 1 to separation zone 2, which may comprise a fractional distilling column of suitable design so that isobutane may be substantially separated from normal butane. Isobutane being discharged from separation zone 2 is conducted thence through line 3 to alkylation treatment, to be described subsequently; while the normal butane is conducted from separation zone 2 through line 4 to cracking zone 5, or a portion of said normal butane may be conducted from line 4 through branch line 6 to storage. Cracking zone 5 may comprise a tubular chamber or a plurality of chambers through which normal butane may be passed at a temperature in the approximate range of 1000–1200° under a pressure of the order of 200–1000 pounds per square inch using an average contact time in the approximate range of 10–80 seconds. By this treatment a portion of the normal butane is dehydrogenated into normal butene while methane, ethane, ethylene, propane, and propene are formed through decomposition reactions. Some conversion into normally liquid products also occurs giving a so-called thermal polymer which comprises essentially olefinic and aromatic hydrocarbons.

The products of butane cracking are conducted from cracking zone 5 through line 7 to separation zone 8, which may comprise a suitable absorbing and stripping system by which 2-carbon atom and lighter gases may be separated and discharged through line 9 to use as fuel or to waste, while 3- and 4-carbon atom olefins and paraffins are conducted through line 10 to catalytic polymerization zone 11 and the normally liquid thermal polymer is conducted from separation zone 8 through line 12 to storage or optionally through line 12' to separation zone 19 to blend with the substantially saturated alkylation product hereinafter described.

Catalytic polymerization zone 11 may comprise a chamber or several chambers containing one or more sections of a granular precalcined composite of an acid of phosphorus and a generally siliceous adsorbent through which the cracked gas containing propene and butenes may be conducted at a temperature in the approximate range of 300–550° F. under a pressure of the order of 200–1500 pounds per square inch using a time of contact sufficient to effect substantially complete polymerization of the normally gaseous olefins.

Catalytic polymers in admixture with propane and butanes are conducted from catalytic polymerization zone 11 through line 13 to separation zone 14, which may consist of a suitable fractionating column provided with adequate reflux so that a fraction consisting essentially of propane may be conducted thence through line 15 to storage; while catalytic polymers in admixture with unconverted butane are conducted through line 16 to which iso-butane is admitted through line 3, already mentioned. The commingled mixture of catalytic polymers, butane, and isobutane is passed from line 16 into alkylation zone 17 containing an alkylation catalyst. Alkylation zone 17 may comprise a suitable reactor provided with adequate agitating, cooling, and/or heating devices for maintaining the uniform temperature required for the alkylation reaction in the presence of a catalyst selected from the group consisting of sulfuric acid, hydrogen fluoride, phosphoric acid, and aluminum chloride with hydrogen chloride.

In case alkylation of isobutane by catalytic polymers is effected in the presence of a precalcined composite of an acid of phosphorus and a generally siliceous adsorbent, alkylation zone 17 may comprise a chamber or plurality of chambers which may be charged with granular catalytic material and operated under the conditions of temperature and pressure required for effecting the desired reaction.

These different alkylation catalysts, which may be used alternatively, are not necessarily equivalent in their action and the conditions of temperature, pressure, and time employed for any given alkylation reaction are determined by the catalyst, the composition of the reaction mixture, and by other factors.

Normally liquid products formed by the alkylation of isobutane by depolymerization products of catalytic polymers and admixed unconverted butanes are withdrawn continuously from alkylation zone 17 through line 18 to separation zone 19, which may comprise one or more fractional distilling columns of adequate design by which butanes may be separated from the alkylation products and recycled through line 20 to commingle with fresh butane fraction being introduced through line 1 to separation zone 2. In separation zone 19 the total alkylation product may be fractionally distilled and a fraction of desired end point withdrawn through line 21 to storage, while the higher boiling residue may be withdrawn through line 22.

If desired, the thermal polymers comprising essentially olefinic and aromatic hydrocarbons which were conducted from separation zone 8 through line 12 may be introduced, by way of optional line 12', to separation zone 19 and therein blended and fractionated with the total alkylation product produced in alkylation zone 17. With this arrangement the material being withdrawn from separation zone 19 through line 21 will consist of a fractionated blend of alkylation product and thermal polymers, while the material being discharged through line 22 will consist of a distillation residue from the total alkylation products and thermal polymers.

The combination process of this invention may thus be used for converting isobutane-normal butane mixtures into substantial yields of essentially paraffinic gasoline of high octane number.

The following example is introduced to show results normally obtainable in the continuous operation of the process, although these data are not presented with the intention of unduly limiting the generally broad scope of the invention:

A butane fraction separated from natural gas and consisting of 29 mole per cent isobutane and 71 mole per cent of normal butane was separated substantially into isobutane and normal butane by fractional distillation. The normal butane fraction was cracked at 1040° F. under a pressure of 750 pounds per square inch and a gas mixture was produced containing 24.8 mole per cent of propene and butenes, 37.2 mole per cent of waste products consisting of hydrogen, methane, ethane, and propane, and 38.0 mole per cent of unconverted normal butane. This olefin-containing gas, after removal of the 2-carbon and lighter gases, was conducted to catalytic polymerization in the presence of a precalcined composite of pyrophosphoric acid and diatomaceous earth at a temperature of 475° F. under a pressure of 1100 pounds per square inch whereby 75% by volume of the normally gaseous olefin were converted into a normally liquid mono-olefinic product which was freed from propane by fractional distillation, admixed with isobutane, and conducted to alkylation. The catalytic polymers in admixture with iso-butane and unconverted normal butane were passed through another reactor containing a fresh portion of the precalcined composite of pyrophosphoric acid and diatomaceous earth at a temperature of 850° F. under a pressure of 3000 pounds per square inch and a substantially saturated hydrocarbon mixture was obtained containing 90% by volume of 300° F. end point gasoline of 92 octane number.

Based upon a fresh charge of 830 barrels of butane fraction per day containing 29 mole per cent of isobutane and 71 mole per cent of normal butane, butane cracking followed by catalytic polymerization produced 14 barrels per day of pyrolytic polymer and 187 barrels per day of catalytic polymer of 82 octane number. Continuously as produced the catalytic polymer was used for alkylating isobutane, as described. From this alkylation treatment was obtained a daily product of 384 barrels of 300° F. end point gasoline of 92 octane number and 105 average molecular weight, together with 49 barrels of alkylation product residue with 55.1 A. P. I. gravity and 130 average molecular weight.

The results of this run show yield and octane number advantages of the combination process over the results obtained by cracking butane and catalytically polymerizing the olefins to liquid products. Also, the process of this invention has the advantage of producing a saturated product and requiring less cracking of butane with less formation of undesirable light gaseous products.

The character of the present invention and its novelty and utility for producing gasoline of high octane number from butanes can be seen from the preceding specification and numerical data presented, although neither section is intended to unduly limit its generally broad scope.

I claim as my invention:

1. A continuous process for producing gasoline from a mixture of isobutane and normal butane which comprises separating isobutane from normal butane by fractional distillation; cracking said normal butane to produce a gas mixture containing polymerizable olefins; separating a fraction containing 2-carbon atom and lighter hydrocarbon gases, a mixture comprising essentially 3- and 4-carbon atom olefins and paraffins, and a normally liquid fraction consisting of thermal polymers; contacting said mixture comprising essentially 3- and 4-carbon atom olefins and paraffins with a polymerization catalyst to produce polymers in admixture with propane and butane; separating said propane from catalytic polymers and butane; admixing said catalytic polymers and butane with isobutane separated from the original butane mixture; reacting said isobutane with said catalytic polymers in the presence of an alkylation catalyst to produce a substantially saturated hydrocarbon product; and fractionally distilling said hydrocarbon product to separate a normally liquid mixture of alkylation products from unconverted butanes which are recycled to admixture with the butanes charged to the original butane fractional distillation.

2. A process such as claimed in claim 1 wherein the cracking of normal butane is effected at a temperature in the approximate range of 1000–1200° F.

3. A process such as claimed in claim 1 wherein the cracking of normal butane is effected at a temperature in the approximate range of 1000–1200° F., under a pressure of the order of 200–1000 pounds per square inch.

4. A continuous process for producing gasoline from a mixture of isobutane and normal butane which comprises separating isobutane from normal butane by fractional distillation; cracking said normal butane at a temperature in the approximate range of 1000–1200° F. under a pressure of the order of 200–1000 pounds per square inch with an average contact time in the approximate range of 10–80 seconds to produce a gas mixture containing polymerizable olefins; separating a fraction containing 2-carbon atom and lighter hydrocarbon gases, a mixture comprising essentially 3- and 4-carbon atom olefins and paraffins, and a normally liquid fraction consisting of thermal polymers; contacting said mixture comprising essentially 3- and 4-carbon atom olefins and paraffins with a polymerization catalyst to produce catalytic polymers in admixture with propane and butane; separating said propane from catalytic polymers and butane; admixing said catalytic polymers and butane with isobutane separated from the original butane mixture; reacting said isobutane with said catalytic polymers in the presence of an alkylation catalyst to produce a substantially saturated hydrocarbon product; and fractionally distilling said hydrocarbon product to separate a normally liquid mixture of alkylation products from unconverted butanes which are recycled to admixture with the butanes charged to the original butane fractional distillation.

5. A process such as claimed in claim 4 wherein the 3- and 4-carbon atom olefins formed by cracking normal butane are polymerized at a temperature in the approximate range of 300–550° F. under a pressure of the order of 200–1500 pounds per square inch in the presence of a precalcined composite of an acid of phosphorus and a generally siliceous adsorbent.

6. A process such as claimed in claim 4 wherein the 3- and 4-carbon atom olefins formed by cracking normal butane are polymerized at a temperature in the approximate range of 300–550° F. under a pressure of the order of 200–1500 pounds per square inch in the presence of a precalcined composite of pyrophosphoric acid and diatomaceous earth.

7. A process such as claimed in claim 4 wherein the alkylation catalyst comprises a precalcined composite of an acid of phosphorus and a generally siliceous adsorbent maintained at a temperature in the approximate range of 600–900° F. under a pressure of the order of 1000–3000 pounds per square inch.

8. A continuous process for producing gasoline from a mixture of isobutane and normal butane which comprises separating isobutane from normal butane by fractional distillation; cracking said normal butane at a temperature in the approximate range of 1000–1200° F. under a pressure of the order of 200–1000 pounds per square inch with an average contact time in the approximate range of 10–80 seconds to produce a gas mixture containing polymerizable olefins; separating a fraction containing 2-carbon atom and lighter hydrocarbon gases, a mixture comprising essentially 3- and 4-carbon atom olefins and paraffins, and a normally liquid fraction consisting of thermal polymers; contacting said mixture comprising essentially 3- and 4-carbon atom olefins and paraffins at a temperature in the approximate range of 300–550° F. under a pressure of the order of 200–1500 pounds per square inch with a precalcined composite of pyrophosphoric acid and diatomaceous earth to produce catalytic polymers in admixture with propane and butane; separating said propane from catalytic polymers and butane; admixing said catalytic polymers and butane with isobutane separated from the original butane mixture; reacting said isobutane with said catalytic polymers in the presence of a precalcined composite of an acid of phosphorus and a generally siliceous adsorbent at a temperature in the approximate range of 600–900° F. under a pressure of the order of 1000–3000 pounds per square inch to produce a substantially saturated hydrocarbon product; and fractionally distilling said hydrocarbon product to separate a normally liquid mixture of alkylation products from unconverted butanes which are recycled to admixture with the butanes charged to the original butane fractional distillation.

9. A process for producing more valuable products from a hydrocarbon mixture containing normal butane and isobutane which comprises fractionating the mixture to separate an isobutane fraction and a normal butane fraction, subjecting the latter to conversion to produce normally gaseous polymerizable olefins therefrom, subjecting olefins thus formed to polymerization, combining resultant olefin polymers with said isobutane fraction and subjecting the mixture to alkylation.

10. The process as defined in claim 9 further characterized in that said conversion of the normal butane fraction is a thermal cracking operation.

11. A process for producing more valuable products from a hydrocarbon mixture containing normal butane and isobutane which comprises fractionating the mixture to separate an isobutane fraction and a normal butane fraction, subjecting the latter to conversion to produce normally gaseous polymerizable olefins therefrom and separating from the conversion products a fraction containing butene and unconverted butane, subjecting the last-named fraction to polymerization and combining resultant olefin polymers and unconverted butane with said isobutane fraction, subjecting the commingled butanes and polymers to alkylation, separating the normally liquid alkylation products from unreacted butanes, and supplying the latter to the first-mentioned fractionating step.

SAMUEL S. ALLENDER.